United States Patent [19]  [11]  4,064,389
Patterson  [45]  Dec. 20, 1977

[54] SYSTEM AND METHOD FOR AUTHENTICATING AN ELECTRONICALLY TRANSMITTED DOCUMENT

[75] Inventor: Peter Theodore Patterson, Cinnaminson, N.J.

[73] Assignee: RCA Corporation, New York, N.Y.

[21] Appl. No.: 698,930

[22] Filed: June 23, 1976

[51] Int. Cl.² .................. G06K 15/02; H04Q 5/00
[52] U.S. Cl. .................. 235/431; 340/149 A; 358/256
[58] Field of Search .................. 235/61.7 B, 61.9 R, 235/61.6 R; 340/149 A, 172.5; 179/2 CA, 2 DP, 6.3 CC, 6.3 R

[56] References Cited
U.S. PATENT DOCUMENTS

| | | | |
|---|---|---|---|
| 3,622,995 | 11/1971 | Dilks et al. | 235/61.9 R |
| 3,822,375 | 7/1974 | Ozeki et al. | 235/61.9 R |
| 3,852,571 | 12/1974 | Hall et al. | 235/61.7 B |
| 3,956,615 | 5/1976 | Anderson et al. | 235/61.7 B |

Primary Examiner—Daryl W. Cook
Attorney, Agent, or Firm—H. Christoffersen; Joseph D. Lazar; Raymond E. Smiley

[57] ABSTRACT

A method and apparatus are disclosed for electronically transmitting to a remote point unique data to be included in a document and for electronically transmitting from a second independent source an authenticating mark for the document. Where a plurality of documents, all containing common information, are being transmitted, the common information is transmitted only once. Equipment at the remote location prints the finished document(s) ready for delivery to the recipient(s).

8 Claims, 3 Drawing Figures

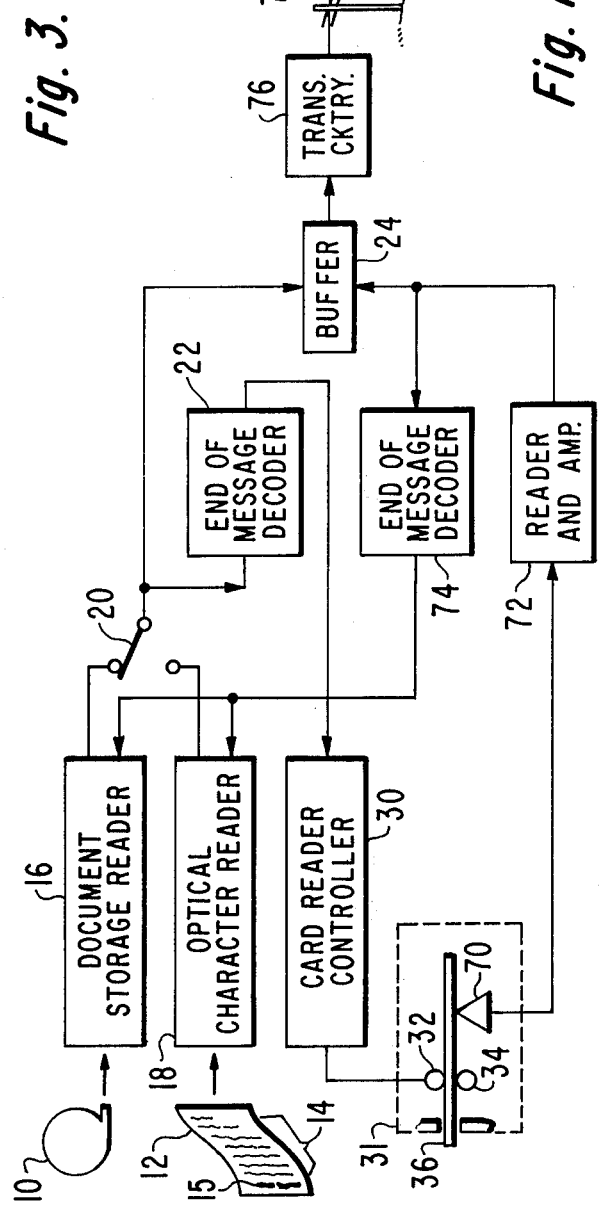
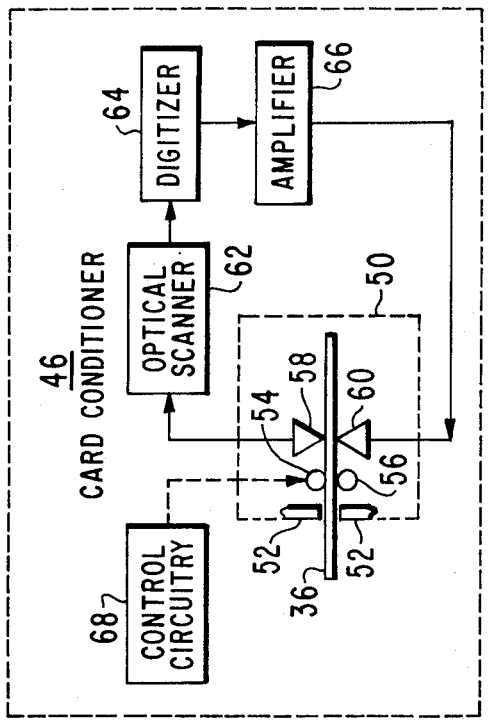
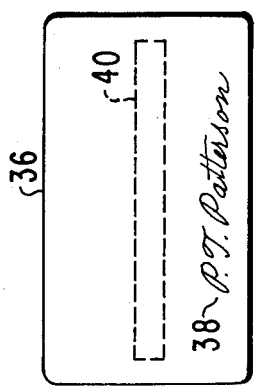
Fig. 1.
Fig. 2.
Fig. 3.

SYSTEM AND METHOD FOR AUTHENTICATING AN ELECTRONICALLY TRANSMITTED DOCUMENT

BACKGROUND OF THE INVENTION

It has been a common practice to authenticate a written document by the signature of the author or by some similar means. Thus, for example, a typical letter includes both the text and the signature of the writer. The latter serves not only to identify the author but also indicates that he acknowledges authorship and in general authenticates the letter to the recipient thereof. Other documents such as, for example, purchase orders, also typically provide for signatures to indicate authenticity. Historically, letters and other documents have been physically transported to points remote from the sender by means of the mail service or private carrier.

As the cost of transportation rises and thus the cost of the mail service rises electronic means are being considered to "transport" the mail. In such a system the contents of letters and other documents are converted to electronic form or, if originating in electronic form (such as computer-generated bills), are maintained as such and suitably transmitted to the selected remote point. Some means of authentication or approval of such electronically-transmitted documents must be provided. The conventional facsimile processor for reading both the text of a document and an author's signature or mark and transmitting the same are too slow and expensive for transmission of large amounts of mail. Digital means of scanning and transmitting the printed text of a letter or other document or transmitting computer generated information while fast and relatively inexpensive, is not readily adapted to transmit written authentication.

SUMMARY OF THE INVENTION

A system for electronically transmitting from an input point to a remote point the contents of a document which includes a machine readable text comprises means at the input point for scanning the document and producing corresponding electronic signals, and means for reading from a card digitized signals corresponding to a signature and converting the digitized signals to electronic signals. Means at the remote point are responsive to the electronic signals for the text and signature for printing the document with indicia of authenticity.

BRIEF DESCRIPTION OF THE DRAWING

FIG. 1 is a block diagram of an electronic mail handling system embodying the present invention.

FIG. 2 illustrates a credit card for supplying authenticating or fixed information to the system of FIG. 1; and FIG. 3 illustrates a device for conditioning the card of FIG. 2 for use in the system.

DETAILED DESCRIPTION OF A PREFERRED EMBODIMENT

Referring to FIG. 1, a source of information ultimately to be printed on a document is illustrated as a magnetic tape reel 10. Information source 10 may contain, by way of example, information to be printed on a plurality of electric bills or purchase orders. This information may include usage, price and customer name for each utility customer and comparable information for purchase order vendors. The information source may be a tape, a disc, a core memory or any other suitable memory. Alternatively, the information source may be typically a letter 12 which preferably includes a machine prepared (typewritten) text portion 14, either written on letter-head stationery or blank stationery and which may include authentication such as a (handwritten) signature 15. An appropriate reading device 16 or optical character reader 18 is provided to convert its input data or letter text into electronic digital signals. Reader 18 is of conventional type which converts each character seriatim into a binary word or code defined by $n$-bits where $n$ is typically six. Signatures are not translated into $n$-bit codes, and, indeed, signatures if present, are intentionally according to this invention, not translated, as will be explained.

As indicated, the preferred form of the letter is in machine printed form. It will be understood, however, that optical reader 18 may be of the type which can read a hand-written text and convert such text into binary words.

Output terminals of readers 16 and 18 are coupled to opposed poles of a switch 20. The common pole of switch 20 is coupled to an end of message decoder (EOMD) 22 and to a buffer 24. It will be understood that in a typical installation only one of the other of readers 16 and 18 may be supplied. For such a system switch 20 would not be necessary.

As is well known many documents including most letters and many purchase orders have signatures to indicate authenticity. To provide a reader 18 which can convert both typewritten text and handwritten signatures to digital form is costly. Likewise, information recorded on information storage medium 10 will not normally have stored signatures. For systems which embody a storage device 10 and its associated reader 16, a special code may be provided after each message to which a signature is to be added. Such a special code is decoded by EOMD 22 which produces an appropriate pulse. Similarly in the case of a letter 12 the end of the text 14 is noted by some means such as a special mark or simply a certain amount of the page having been scanned resulting in a pulse being produced by EOMD 22.

The pulse from the output terminal of EOMD 22 is coupled to an apparatus for authenticating a letter or other document. In particular, EOMD 22 is coupled to a card reader controller 30. Controller 30 controls the operation of a card reader 31 (illustrated as a dashed box) which includes a drive roller 32 and idler roller 34 between which passes a card 36. Card 36 is illustrated in greater detail in FIG. 2 to which attention is now directed.

The nature of card 36 will depend on whether its purpose is to provide authentication (on an authentication card) or to provide fixed graphics information for a document or letterhead (a graphics card). A graphics card includes, for example, information concerning preprinted portions of a document. In the case of a bill this will include the various boxes and their descriptions in which the variable data is to be placed, (i.e., the graphics of the form). In the case of a letter this would include the letterhead information. Assuming that card 36 is an authentication card it is preferably of the size, shape and material of a typical wallet size credit card. Such a card has a place for a signature or other authentication mark 38 on one surface (the top surface as illustrated) while a ribbon of magnetic, photographic or other recording material, 40 (illustrated in phantom) is applied to the other surface. A digitally encoded version of the signature 38 is recorded on ribbon 40 by the card conditioner device 46 illustrated in FIG. 3 to which attention is now directed.

A card transcriber 50 (enclosed by a dashed line) having suitable housing (not shown) includes walls 52 (only a portion shown) defining a slot into which card 36 is inserted, drive rollers 54, 56, an optical read head 58 and appropriate (e.g., optical or magnetic) write head 60. Read head 58 is coupled to an optical scanner 62 of conventional design which generates an electronic signal of one value or another depending on whether the head 58 is over a portion of writing or a portion of background. Optical scanner 62 is coupled to a suitable digitizer 64 for producing time referenced digital signals depending on the value of the signal produced by scanner 62. The output terminal of digitizer 64 is coupled to the input terminal of a suitable amplifier 66 the output terminal of which is coupled to write head 60. Control circuitry 68 for controlling movement of rollers 54, 56 is coupled thereto.

Operation of the device of FIG. 3 is as follows. Assuming an authentication card is to be conditioned for use in the system of FIG. 1, a card 36 having a signature or other authentication mark 38 written thereupon is inserted in the opening defined by walls 52 of reader 50. Rollers 54 and 56 controlled by circuitry 68 effect movement of the card past read head 58. Passing over a portion (for example the upper portion) of the signature 38 will result in analog signals from optical scanner 62 being digitized by digitizer 64. The digital signals are amplified by amplifier 66 causing via transducer 60 a digital pattern to be written on ribbon 40 (FIG. 2). The process is repeated in sequence on other portions of the signature until a digital pattern corresponding to signature 38 appears on ribbon 40 of card 36.

Card 36 has been described as an authentication card. Card 36 may also be a blank form such as used for a letter head, an electric utility bill or purchase order form. Conditioner 46 processes such cards in a similar manner converting the graphic format of the card into digital signals. For such graphic cards the digital information representing the graphic format may be, for convenience, stored in a separate storage medium to be utilized in lieu of reading a conditioned card 36. The stored digital data for such an arrangement is read by reader 31. For purposes of the present description however the source containing the digitized information will hereafter be referred to as a conditioned card.

Returning again to FIG. 1, a magnetic, optical or other appropriate transducer 70 adapted to read ribbon 40 (shown in FIG. 2) is coupled to a combined reader and amplifier 72. The output terminal of amplifier 72 is coupled to EOMD 74 and to a second input terminal of buffer 24. The output terminal of EOMD 74 is coupled to a control terminal of document storage reader 16 and optical reader 18.

The output terminal of buffer 24 is coupled to transmission circuitry 76. The output terminal of transmission circuitry 76 is coupled to appropriate communication facilities illustrated schematically as telephone lines 78 which can transmit electronic signals from buffer 24 selectively to a multiplicity of remote points (not shown). Telephone lines 78 as illustrated are coupled to a memory 80 which operates under control or direction of a controller 82 also coupled to the memory. Memory 80, controller 82 and printer 84 are located at a point remote from the system components to the left of line 78. Typically, these respective components are located at postal facilities in distant cities.

The output terminal of memory 80 is coupled to a printer 84 for producing in hard copy form documents 86 corresponding to or representing the original letter 12 or generating, as an origianl document, a bill or purchase order having the desired information provided by source 10. Printer 84 must have the capacity to print both alphanumeric characters and graphics such as form lines, logos and signatures. A printer of the ink jet type is ideally suited to this requirement. However, depending on the speed, cost and reliability requirement, a specialized printer means may be desirable. The specialized printer means may take the form of two printers, one for alphanumeric data and one for graphics including signatures.

Operation of the apparatus of FIG. 1 will be first described assuming the contents of a letter 12 is being transmitted electronically to a remote point, to be reproduced at the remote point and authenticated with a printed signature. Following will be a description of the apparatus utilizing documents containing form graphics, such as letterheads, bills and purchase orders.

Switch 20 is set to connect optical reader 18 to buffer 24. A letter containing printed text is inserted in optical reader 18. An authentication card 36 bearing the sender's signature in machine readable form is entered into reader 31. Optical reader 18 is then energized (by means not shown) to read document 12 line by line converting successive characters to equivalent digitally coded signals which are passed through buffer 24, transmission circuitry 76 and communication lines 78 to memory 80 then to printer 84. Printer 84 creates a new document 86 having the same text as document 12 though it may not be identical in appearance owing to differences in character graphics.

After the scan of text 14 is complete an appropriate pulse is produced by EOMD 22 which triggers card reader controller 30 into operation. Card reader controller 30 causes card 36 to be driven past head 70. The resulting electronic signals from amplifier 72 are transmitted through buffer 24, transmission circuitry 76, communication lines 78 and memory 80 to printer 84 which will create on document 86 a likeness of sender's signature or other appropriate authentication mark as digitally encoded on card 36. Since, presumably, the signature card contains the signature of the bearer, this authenticates document 86. Document 86 may then be placed in an envelope preferably by automated equipment to maintain secrecy of the document and delivered by the postal service to the addressee thereof. It should be noted that depending on the speed of operation of transmission facilities 78 and printer 84, memory 80 and controller 82 may not be needed for real time operation of the system.

On some documents such as letters or purchase orders, for example, it may be necessary to have both form graphics (for example, a company logo) and a means of authentication. In that case, initially the form graphics information (e.g., company logo) is entered into reader 31. After that information has been read in and stored in memory 80 the resulting pulse from EOMD 74 triggers reader 16 or 18 into action (depending on the setting of document or switch 20). After the data for each document or letter is read the resulting pulse from EOMD 22 triggers card reader controller 30 to read an authentication card 36 producing a pulse from EOMD 74 to initiate reading of data from the next document or letter, and so forth. It should be noted that in the case of documents such as for example, utility bills requiring no mark of authentication, the operation of system is as described above, except that after the graphics card has been read in reader 31 and stored in memory 80, the unique data for successive documents as recorded on information source 10 are transmitted seriatim to memory 80 for purpose of completely finished documents at printer 84. The finished documents will contain both the form graphics common to all documents and the unique information for each document.

What is claimed is:

1. A system for transmitting electronically from an input point to a remote output point the contents of a document which includes a machine-readable text and for authenticating that document by means of a card containing an authentication mark in digitized machine readable form, comprising in combination:

means at said input point for optically scanning said text of said document and for producing corresponding electronic signals;

means for reading from said card digitized signals corresponding to said authentication mark and for producing electronic signals corresponding thereto;

means at said output point adapted to be coupled to said scanning means and said card reading means and when so coupled receptive of said signals corresponding to said text and to signals corresponding to said mark for producing a document containing the same text as that contained in said document at said input point, and containing said mark authenticating said document.

2. The combination as set forth in claim 1 wherein said card includes a written signature and machine-readable digitized data corresponding to said signature.

3. An electronic mailing system for authenticating a document the contents of which are electronically transmitted, said contents having a machine-readable text comprising is combination:

means for scanning said document and converting the text thereof to electronic signals;

means responsive to the entire text being scanned for producing an end-of-message signal;

a card bearing a machine readable digitized version of an authentication mark, means responsive to said end-of-message signal for reading said card and producing electronic signals corresponding thereto;

means at a remote location adapted to be coupled to said document scanning means and card reading means and when so coupled receptive of said signals from said scanning means and reading means for producing a document having the same text as the scanned document and bearing an authentication mark representative of said mark on said card.

4. An electronic mailing system for transmitting electronically from a point of origin to a remote point the contents of a plurality of documents which include material common to all and each of which includes unique data, comprising in combination:

means containing machine readable information corresponding to said common material;

means for reading said machine readable information and for producing digital electronic signals corresponding thereto and for producing an end-of-message signal when all said machine readable information has been converted to electronic signals;

means containing said unique data for each document;

means coupled to said means containing unique data and responsive to said end-of-message signal for converting said unique data to digital electronic signals;

means at a remote point adapted to be coupled to said means for reading said machine readable information for receiving and storing said common material signals only once, said remote point means further coupled to said means for converting said unique data for receiving signals corresponding to said unique data for each document;

printing means responsive to unique data signals and coupled to said memory means for printing for each document the common information and unique data.

5. The combination of claim 4, wherein said documents require authentication, and wherein said means containing unique data contains a second end-of-message signal after the contents of each document requiring authentication, and further including at said point of origin an authentication card bearing an authentication mark in machine-readable form for each document requiring different authentication also readable by said reading means, and also including means responsive to said second end-of-message signal for triggering said reading means to read said authentication mark from said authentication card for transmission to and printing at said remote point.

6. The method of transmitting electronically the contents of a document having a machine-readable text from an input point to a remote output point and authenticating the document comprising the steps of:

a. scanning said machine-readable text and converting said text to corresponding electronic signals;

b. providing a card containing a digitized machine-readable form of an authentication mark;

c. scanning said card and converting the signals thereon to corresponding electronic signals;

d. transmitting the electronic signals produced in steps a) and c) to a remote point;

e. at said remote point, printing a document containing said text of the original document and printing said authentication mark.

7. The method of generating at a point remote from an input point a plurality of documents which include graphics information common to all documents and information unique to each document, comprising the steps of:

providing at said input point a card containing, in machine-readable form, said common graphics information;

converting said graphics information in machine-readable form from said card to electronic signals and transmitting said signals from said input point to said remote point;

at said remote point storing said electronic signals;

providing at said input point in machine-readable form, the unique data contents of said plurality of documents;

reading said machine-readable form for said document contents at said input point and converting the same to electronic signals for transmitting said signals to said remote point;

generating at said remote point documents containing graphics in accordance with said stored electronic signals and containing unique data in accordance with electronic signals associated therewith.

8. The method as set forth in claim 7, wherein said documents require an authentication mark further including steps of:
providing a card for each authenticating mark required containing said authenticating mark in machine-readable form;
transmitting said mark in electronic form from said input point to said remote point;
generating said authenticating mark on each of said documents.

* * * * *